United States Patent [19]
Shaffer

[11] 3,785,515
[45] Jan. 15, 1974

[54] TRANSVERSE-TRAVELING LOAD HANDLING VEHICLE

[75] Inventor: Walter M. Shaffer, Peoria, Ill.

[73] Assignee: Towmotor Corporation, Cleveland, Ohio

[22] Filed: Jan. 14, 1972

[21] Appl. No.: 217,897

[52] U.S. Cl. .............. 214/75 G, 187/9, 180/1 AW
[51] Int. Cl. .......................................... B60p 1/54
[58] Field of Search .............. 180/2; 214/75 G, 214/660, 670; 187/9

[56] References Cited
UNITED STATES PATENTS

| | | | |
|---|---|---|---|
| 3,231,109 | 1/1966 | Bengil et al. | 214/670 |
| 3,269,475 | 8/1966 | Voelker | 180/2 |
| 3,586,183 | 6/1971 | Shaffer | 214/660 |

Primary Examiner—Gerald M. Forlenza
Assistant Examiner—Lawrence J. Oresky
Attorney—Martin Majestic et al.

[57] ABSTRACT

An apparatus and method in the form of a transverse-traveling load handling vehicle having transport wheels adapted to move the vehicle in a forward and reverse longitudinal direction and auxiliary sets of extendible-retractable supporting wheels mounted at right angles relative to the transport wheels for raising the vehicle and its transport wheels to a position elevationally spaced from the surface supporting the vehicle to permit the vehicle to travel transversely of its forward-reverse direction and thus require only a minimum-width aisle between the stacks of material in a storage area being serviced by the vehicle.

2 Claims, 3 Drawing Figures

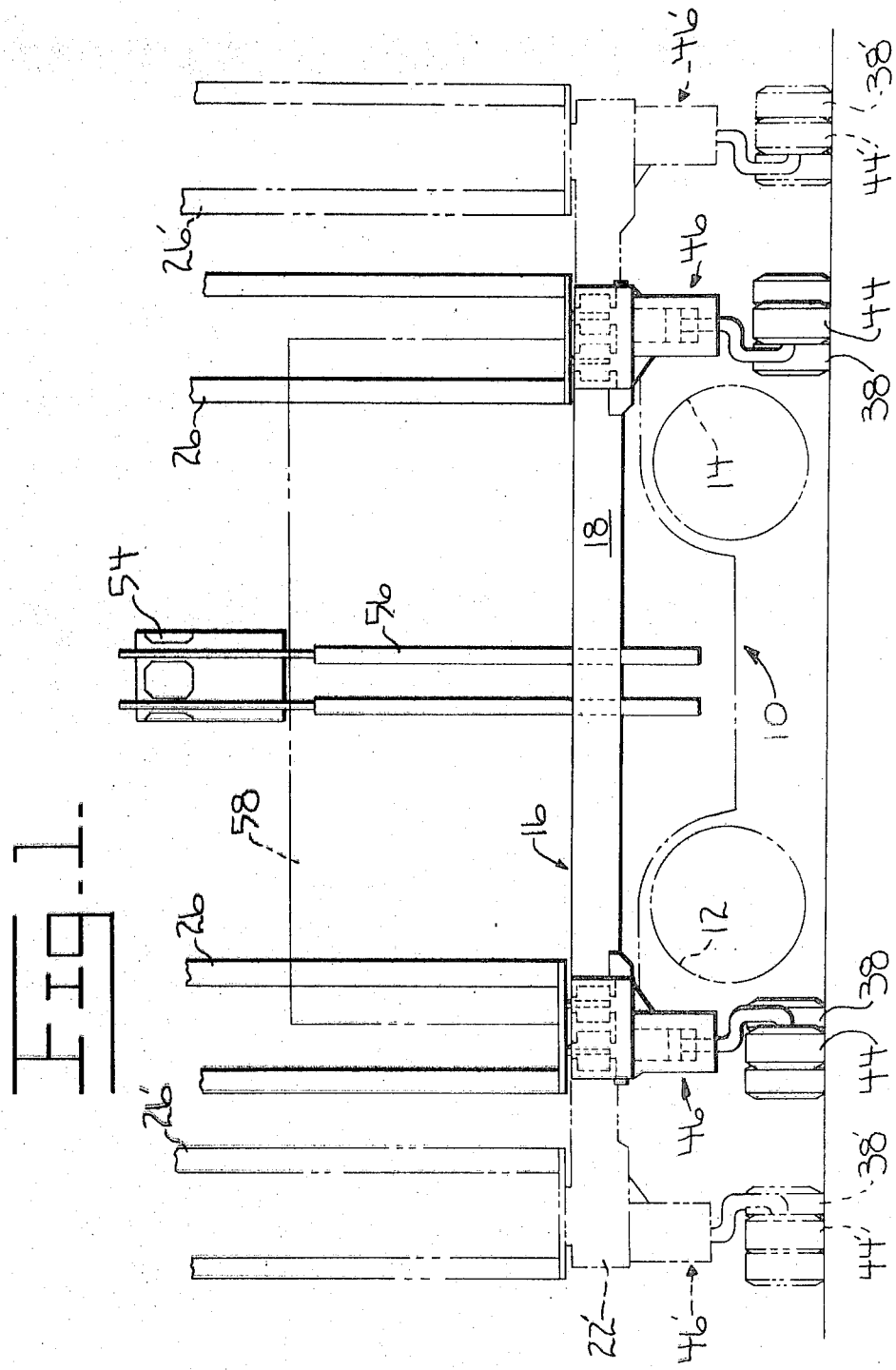

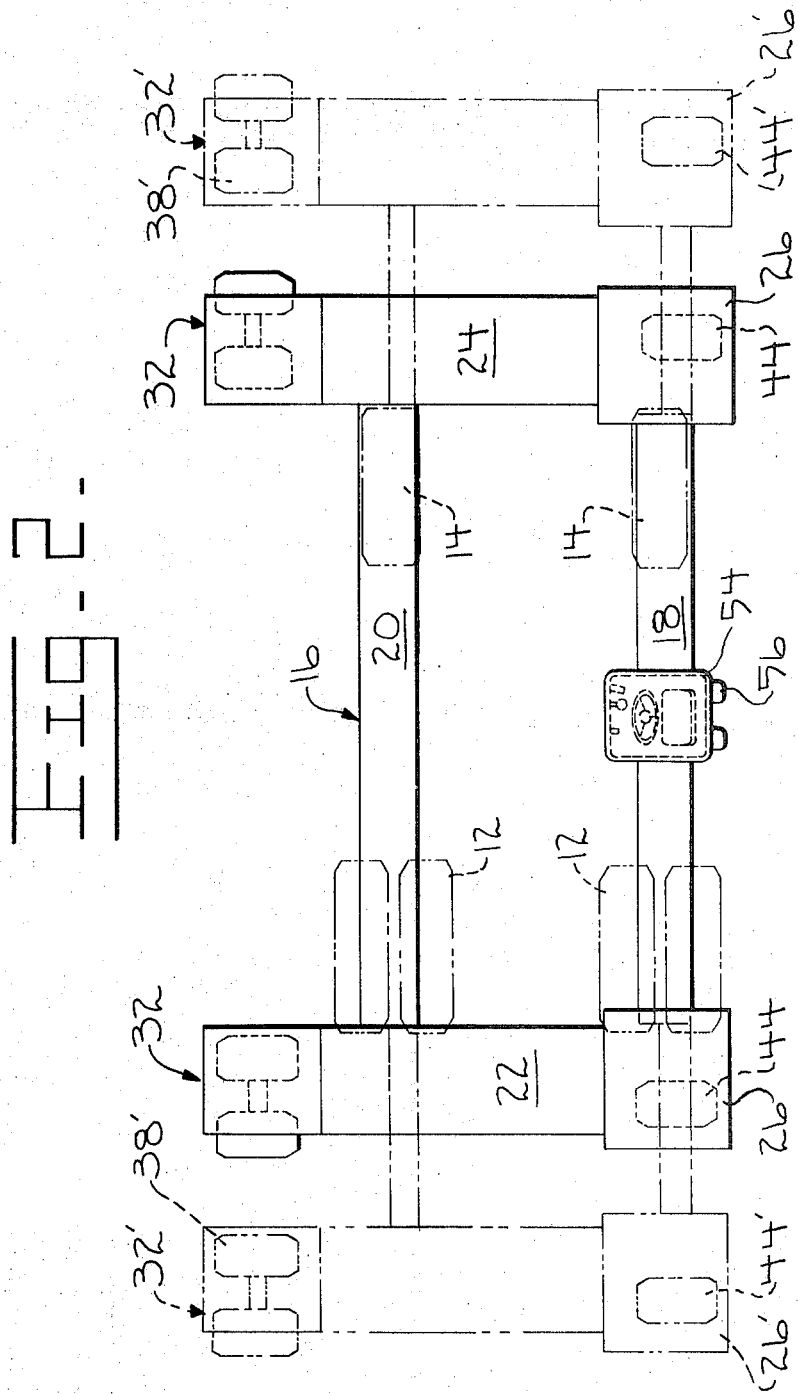

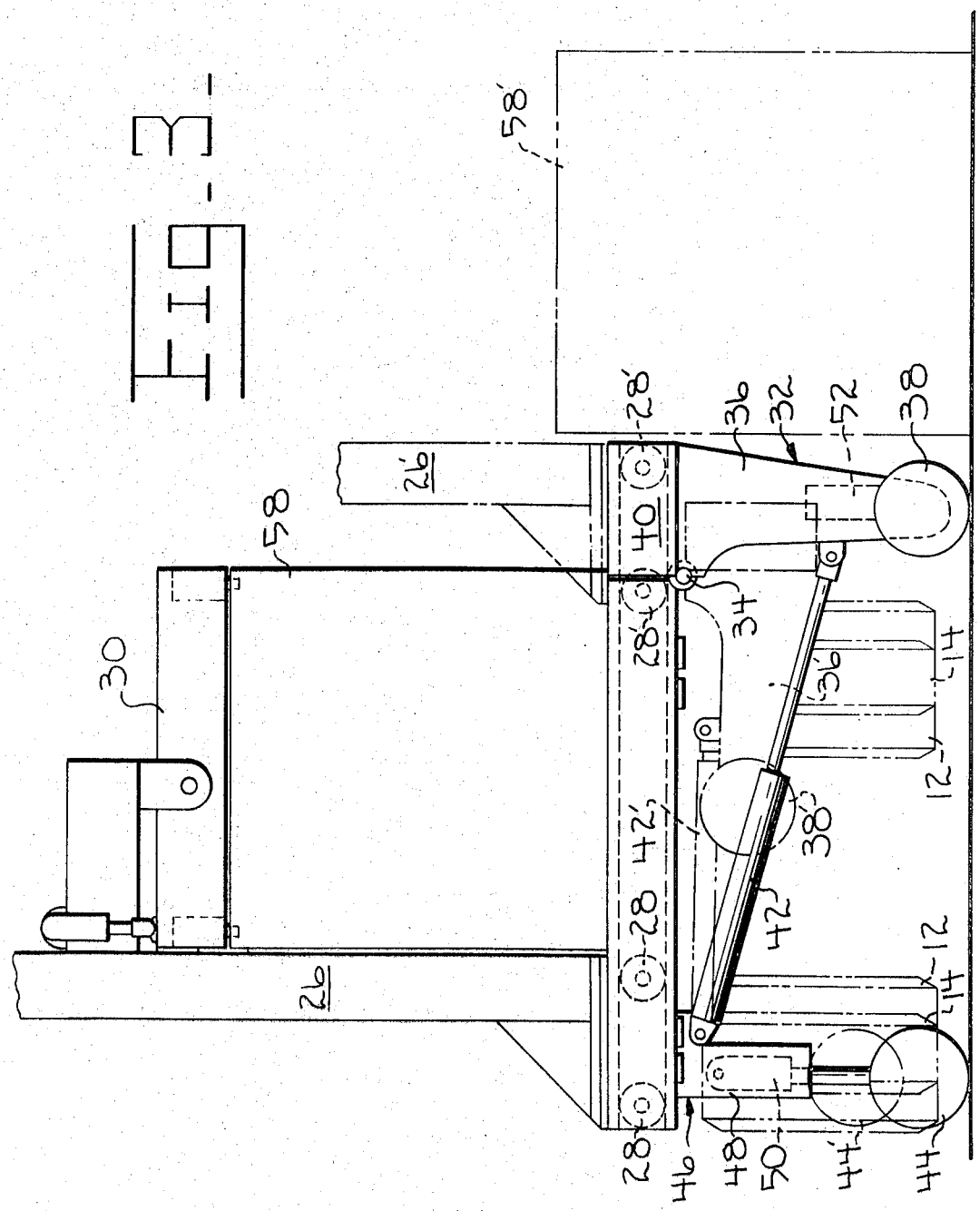

TRANSVERSE-TRAVELING LOAD HANDLING VEHICLE

CROSS-REFERENCE TO RELATED PATENT

Cross-reference is made to U.S. Pat. No. 3,586,183, issued June 22, 1971, by the instant Applicant. The disclosure of that patent is hereby expressly incorporated by reference.

BACKGROUND OF THE INVENTION

This invention relates generally to a container handling vehicle. More particularly, this invention relates to a container handling vehicle which has a first set of wheels for moving the vehicle in a longitudinal direction and a second, independent set of wheels, the extension of which to operational engagement with the ground supporting surface raises the first set of wheels to an inoperative position elevationally spaced from the same surface.

The relatively recent introduction of the use of containers in the shipping industry has given rise to manifold problems in the handling and storage of such containers.

For example, with regard to the effective utilization of storage space, it is apparent that the space in the aisles or roadways in material storage areas is wasted due to the relatively wide aisles which are required in order to accommodate the wide turning radius of conventional lift vehicles. Another problem is stacking since, in order to effectively use the available storage space, the stored containers should be stacked to as great a height as stack stability will allow, as well as to a depth greater than a single container.

Various machines are now produced for handling containers or long loads, but these have not been successfully adapted for use in lifting, transporting, and stacking containers so as to realize the maximum storage space available. For example, straddle carriers are unable to stack 20-foot long containers more than two high, or 40-foot long containers more than one high if a reasonable degree of retrieval selectivity is to be maintained. Relatively large, pneumatic-tired, conventional lift trucks can block-stack, or load flat-bed trucks from the side, but are inefficient in their use within storage areas because they require relatively wide aisles or roadways for turning the vehicle to maneuver it and its load into position relative to the stacks of material in such areas. In other words, side-loading lift trucks will not block-stack, and the straddle carriers are not practical for high stacking long loads, nor are they capable of block stacking in depth.

SUMMARY OF THE INVENTION

Accordingly, it is an object of the present invention to provide an improved load handling vehicle.

It is also an object to provide such a load handling vehicle that will permit the use of relatively narrow aisles or roadways and is capable of stacking containers in multi-elevational tiers.

It is also an object of the present invention to provide a transverse-traveling load handling vehicle that is capable of moving transversely both longitudinally in an aisle or roadway and then from the aisle or roadway into the storage area to block-stack containers to a storage depth of two or more containers.

It is a still further object of this invention to provide a method of handling loads permitting the use of narrow aisles or roadways.

Other objects and advantages of the present invention will become more readily apparent upon reference to the accompanying drawings and the following description.

BRIEF DESCRIPTION OF THE DRAWINGS

FIG. 1 is a side elevational view of a transverse-traveling load handling vehicle embodying the principles of the present invention;

FIG. 2 is a top plan view of the vehicle of FIG. 1;

FIG. 3 is an end elevational view of the vehicle of FIG. 1.

DESCRIPTION OF THE PREFERRED EMBODIMENT

Referring now to FIG. 1, a transverse-traveling load handling vehicle embodying the principles of the present invention provides a lift-truck-type chassis generally indicated at 10 and having two sets of transport wheels 12 and 14 shown in phantom line. A fabricated frame assembly 16 is mounted on the chassis as by welding, bolting, or the like.

As best seen in FIG. 2, the frame assembly 16 includes a pair of longitudinally-oriented telescoping frame members 18 and 20 on opposite sides of the vehicle and a pair of transversely-oriented track assemblies 22 and 24 extending gransversely between the telescoping frame members. As seen in FIGS. 1 and 3, a pair of vertical mast assemblies 26 are situated on opposite ends of the vehicle so as to transversely move in the track assemblies on a plurality of mast-mounted support rollers 28. A pair of load handling arms, one of which is shown at 30, are mounted so as to individually extend perpendicularly from the vertical mast assemblies.

As best seen in FIGS. 1 and 2, containers and long loads of varying lengths can be accommodated by extending or retracting the telescoping frame members 18 and 20 by hydraulic jack members, not shown, but of well known construction. The track members and their associated vertical mast assemblies 26 are shown in phantom lines, as shifted from their full-line positions, with the telescoping frame members extended. It may be noted that primes are used throughout this description to denote the shifted position of the various vehicle elements.

As can be seen in FIGS. 2 and 3, a pair of outrigger assemblies 32 are individually, pivotally attached to the outer ends of the track assemblies 22 and 24 by a plurality of pivot pins 34. The outrigger assembly 32 includes an outrigger arm member 36, a downwardly-depending support wheel 38 rotatively mounted at right angles to the vehicle transport wheels 12 and 14, and a track member 40 attached to the outrigger arm extremity opposite the wheels 38. When the outrigger assembly is in its extended vehicle-supporting position, the track member 40 provides a track extension that allows the mast assembly 26 to transversely travel beyond the end of the track assemblies 22 and 24, as at 26', thereby extending the distance a load 58 can be transversely transported for block stacking in the storage area. An extensible hydraulic jack member 42 provides the power and control of the pivotal movement for the outrigger assembly 32. The length of the outrigger arm 36 is such that when the hydraulic jack 42 is extended, the outrigger assembly will be in a substantially vertical position and the vehicle chassis 10 and the transport wheels 12 and 14 on the outrigger or load space side of the vehicle will have been raised to a position elevationally spaced above the ground surface supporting the vehicle.

A pair of support assemblies 46 are located on the vehicle side opposite the outrigger assembly 32 and include a pair of support wheels 44 mounted at right angles to the vehicle transport wheels 12 and 14. The support assembly also includes a longitudinal member 48, a hydraulic jack member 50 and the wheel member 44. The support assemblies are generally vertically oriented with their uppermost ends attached to the lowermost part of the track assemblies 22 and 24. The hydraulic jack's uppermost extremity is fixedly mounted to the support assembly in a downwardly-depending position, with its lowermost extremity rotatively attached to the wheel member. The length of the hydraulic jack is such that when it is extended the vehicle chassis 10 and the transport wheels 12 and 14 on the side of the vehicle opposite the outrigger side will have been raised to a position elevationally spaced above the surface supporting the vehicle. The hydraulic fluid pressure for powering the jacks is provided by a hydraulic system normally associated with lift trucks (not shown).

A pair of hydrostatic motors 52 are shown in FIG. 3 as a part of the outrigger assemblies 32 and are for the purpose of supplying rotative power to the support wheels 38, but it will be apparent that a comparable power system, such as electric motors, could be utilized.

A vehicle operator's station 54 is mounted to the chassis 10 by an extensible mast assembly 56 to provide for greater operator visibility and hence greater safety, as illustrated in FIGS. 1 and 2. FIG. 3 shows a load 58 positioned in transport position on the vehicle.

OPERATION

While the method of operation of the present invention is believed clearly apparent from the foregoing description, further amplification will subsequently be made in the following brief summary of such operation.

Initially, the load handling vehicle is moved in a longitudinal direction in an aisle or roadway on longitudinal transport wheels 12 and 14 to a position where the vehicle operator desires to deposit the load 58 in the block-stack storage area. The load being carried is supported on the transverse track assemblies 22 and 24 in the manner shown in FIGS. 1 and 3. When the load 58 is laterally adjacent the desired storage space, the outrigger assemblies 32 with their appended support wheels 38 are lowered by extending the hydraulic jack members 42. This lifts the chassis wheels 12 and 14, that are adjacent to the outrigger wheels 38, to a position elevationally spaced from the surface supporting the vehicle. The support wheels 44 are lowered by extending the hydraulic jack members 50, thereby causing their adjacent chassis wheels 12 and 14 to be raised to a position elevationally spaced from the surface supporting the vehicle. All chassis transport wheels 12 and 14 are thus out of contact with the vehicle supporting surface, as shown in FIGS. 1 and 3. Motive power is applied through hydrostatic motors 52, or the like, to the support wheels 38, and the vehicle and the load 58 are thence moved in a transverse direction, relative to the aisle, into the block-stack area. The load is raised from the load support track assemblies 22 and 24 through the use of a conventional hydraulic system (not shown). The vertical mast assemblies 26, with their normally associated load carrying arms 30, are moved in a transverse direction relative to the longitudinal axis of the vehicle on the mast rollers 28. The mast rollers travel in the transverse track assemblies 22 and 24. The track members 40 which are a part of the outrigger assemblies 32, allow additional transverse travel of the masts and load, thereby extending the distance the load can be transported in that direction for block-stacking in the storage area. When the vertical mast assemblies 26 reach the vertical mast assembly position 26', as shown in FIG. 3, the load 58 is deposited in the stack area shown in phantom at 58', or it can be block-stacked on top of a load already in the storage area.

To remove the load from the storage area, the lift truck is transversely moved into the block storage area in the manner previously described, unti it is positioned adjacent the side of the load as shown in FIG. 3. The load handling arms 30 are coupled to the load which is then elevated to a position where the bottom surface of the load is a substantial distance above the top surface of the track assemblies 22 and 24. The vertical mast assemblies 26 are then moved transversely on the mast rollers 28 in the track member 40 and track assemblies 22 and 24 until the mast assemblies reach the limit of their retracted transverse travel and the load can be lowered to rest on the supporting top surfaces of the track assemblies 22 and 24. The vehicle then transversely moves on support wheels 38 and 44 from the storage area into the aisle, where the previously described sequence of operations of raising the transport wheels 12 and 14 is reversed. The transverse-traveling wheels 38 and 44 are thereby retracted to positions 38' and 44', respectively, as shown in phantom, and the transport wheels 12 and 14 are thus established in full load-supporting contact with the aisle surface. The truck and load can now continue down the aisle in a normal manner to its destination.

Accordingly, a transverse-traveling load handling vehicle has been described that can travel down an aisle, stop its forward or reverse movement, and move transversely from the aisle into a block-stack storage area to deposit or pick up a load, then transversely return to the aisle and subsequently continue down the aisle.

While the invention has been described and shown with particular reference to the preferred embodiment, it will be apparent that variations might be possible that would fall within the scope of the present invention which is not intended to be limited except as defined in the following claims.

What is claimed is:

1. A load handling vehicle comprising:
   a chassis having mast means thereon and including telescoping frame members whereby various length loads may be accommodated, further said chassis including a plurality of longitudinal transport wheels and power means for motivating said longitudinal transport wheels, and a plurality of lateral transport wheels and power means for motivating said lateral transport wheels in both forward and reverse directions relative to their lateral direction of travel, said lateral transport wheels being mounted on the said telescoping frame members of the chassis for movement therewith, and further including hydraulic jack means for positioning said lateral transport wheels from an inoperative position out of contact with the vehicle-supporting surface to an operative position in contact with the vehicle-supporting surface and wherein said longitudinal transport wheels are out of contact with the vehicle-supporting surface, said lateral transport wheels engaging said vehicle-supporting surface to allow movement of said vehicle in a direction transverse to the direction of movement normally provided by the longitudinal transport wheels and wherein a first plurality of said lateral transport wheels are mounted on outrigger means pivotally attached to said vehicle, and wherein said hydraulic jack means comprise a first plurality of hydraulic jacks for motivating said outrigger means from an inoperative position to an operative position whereby said transport wheels mounted thereon are in contact with the vehicle-supporting surface at a point spaced outwardly of the longitudinal transport wheels, and a second plurality of hydraulic jacks so disposed as to motivate a second plurality of lateral support wheels in a generally vertical direction from an inoperative position to an operative position whereby said transport wheels are in contact with the vehicle-supporting surface.

2. A load handling vehicle comprising:

a chassis including a set of transport wheels adapted to move the vehicle in a predetermined forward-reverse linear direction;

a frame mounted on said chassis;

telescoping frame members mounted on said frame and extending longitudinally of said chassis;

track members extending transversely of said chassis and frame;

vertical mast members adapted to transversely move on said transverse track members;

load handling means adapted to travel in a generally vertically-oriented direction on said mast means;

outrigger means pivotally mounted on said transverse track members;

track extension means mounted on said outrigger means;

vehicle support means mounted on the side of the vehicle opposite to said outrigger means wherein said outrigger means and said vehicle support means are so dimensioned that the wheel means are, in their retracted position, disposed in elevationally-spaced relation above the surface supporting the vehicle;

pivotal lateral transport wheel means having a position downwardly depending from said outrigger means, and a retracted position;

extensible lateral transport wheel means having a position downwardly depending from said vehicle support means, and a retracted position;

said pivotal wheel means and said extensible wheel means adapted in their depending positions to raise said vehicle transport wheel means to a position elevationally spaced above the surface supporting the vehicle and being oriented in right angular relation to said transport wheel means to provide said vehicle with a transverse directional movement capability relative to a longitudinal axis of the chassis thereby allowing said vehicle to move transversely from an aisle into a load storage area to any depth desired, said pivotal wheel means also serving to stabilize said track extension means and thereby said vertical mast members;

power means drivingly connected to at least one of said wheel means to provide the vehicle with a transverse forward-reverse directional movement;

power means whereby said outrigger means and said pivotal wheel means are pivoted to a position below and substantially parallel to the transversely-oriented track means, and said extensible support wheel means is, in its retracted position, raised vertically upwardly above the support surface; and power means to move said wheel means between their depending and retracted positions is a hydraulic jack means.

* * * * *